Figure 1:
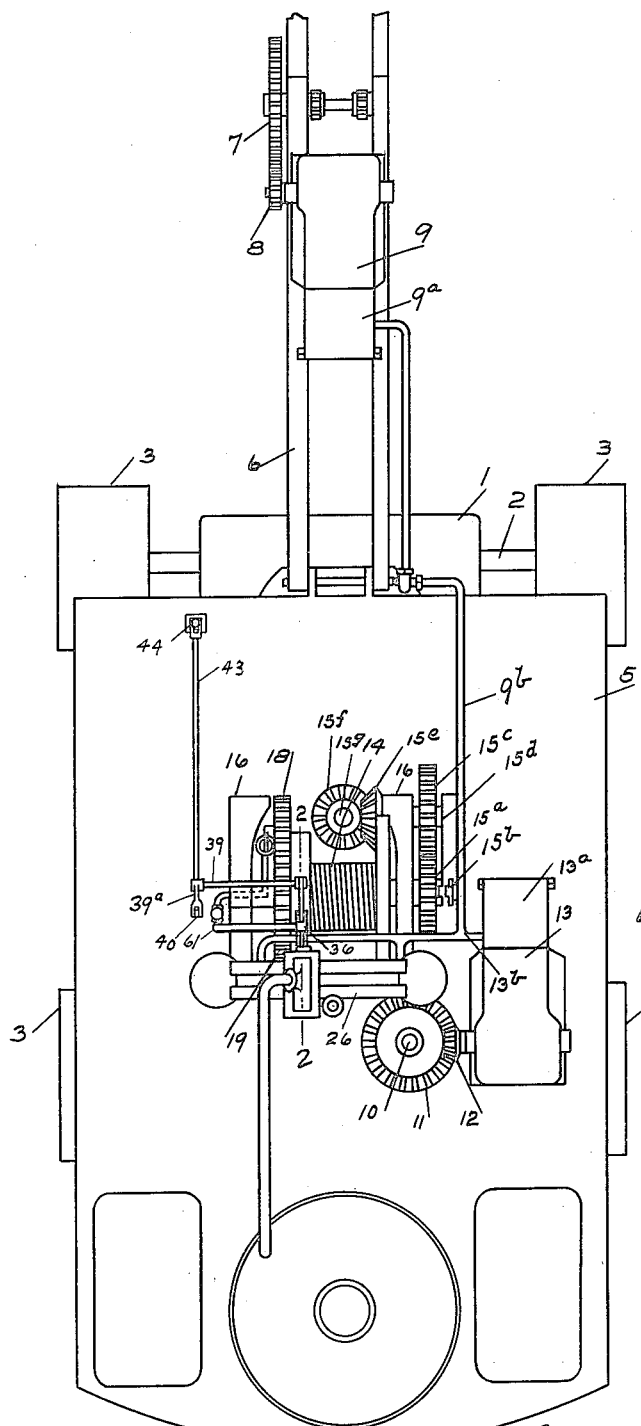

C. B. WESTON.
ENGINE AND FRICTION CLUTCH CONTROL.
APPLICATION FILED JAN. 20, 1915.

1,154,149.

Patented Sept. 21, 1915.
2 SHEETS—SHEET 1.

Witnesses
B. M. Hartman
J. C. Hess

Inventor
Clarence B. Weston
By
Attorneys

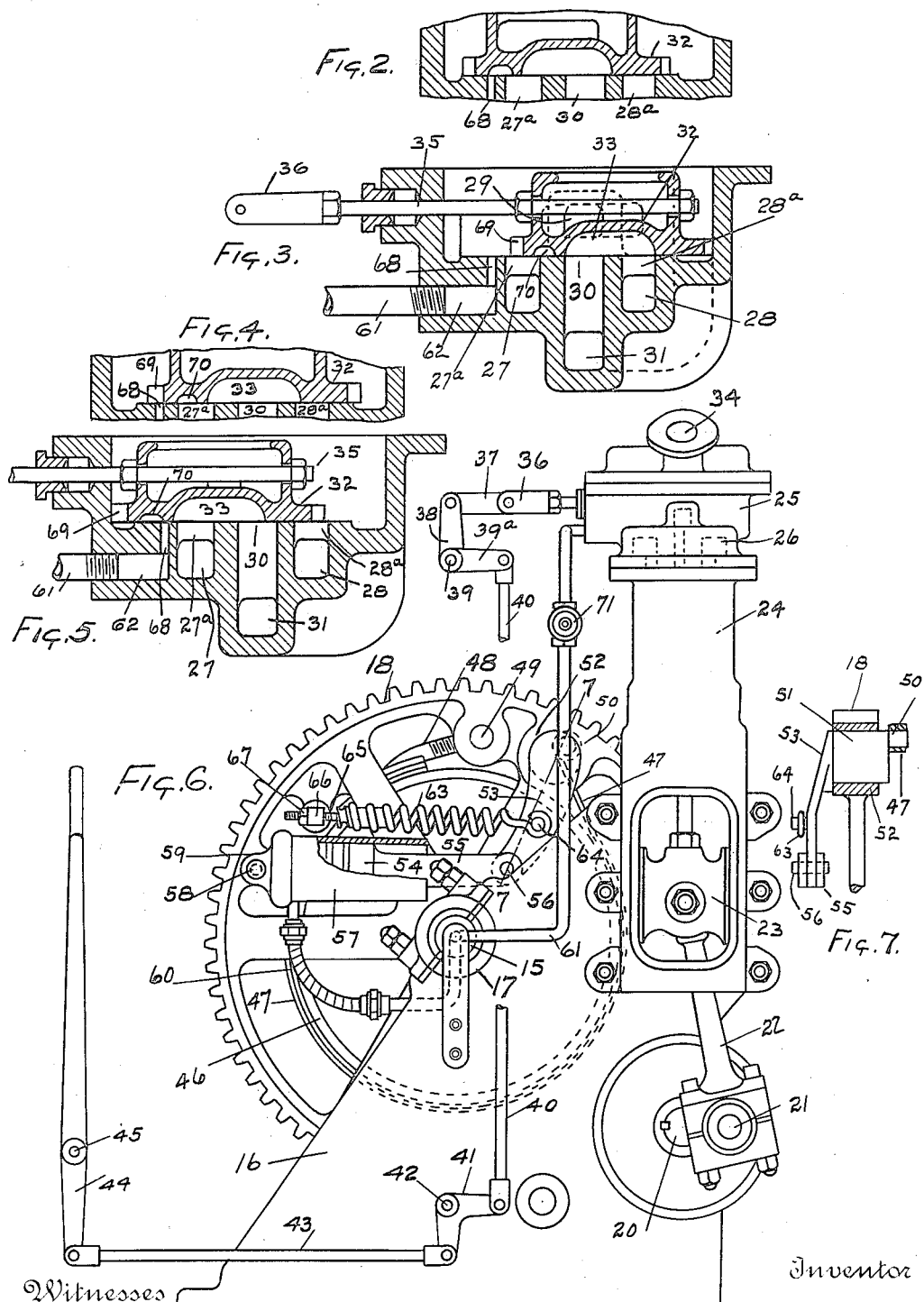

UNITED STATES PATENT OFFICE.

CLARENCE B. WESTON, OF MARION, OHIO, ASSIGNOR TO BALL ENGINE COMPANY, OF ERIE, PENNSYLVANIA, A CORPORATION OF PENNSYLVANIA.

ENGINE AND FRICTION-CLUTCH CONTROL.

1,154,149.   Specification of Letters Patent.   Patented Sept. 21, 1915.

Application filed January 20, 1915. Serial No. 3,360.

*To all whom it may concern:*

Be it known that I, CLARENCE B. WESTON, a citizen of the United States, residing at Marion, in the county of Marion and State of Ohio, have invented new and useful Improvements in Engine and Friction-Clutch Controls, of which the following is a specification.

This invention relates to engine and friction clutch controls and consists in certain improvements in the construction thereof as will be hereinafter fully described and pointed out in the claims.

With many devices, as for example steam shovels, it is necessary to actuate the clutch controlling the drum with which the shovel is operated and approximately at the same time actuate the control for the engine. Practically all of such engines are arranged with a valve control and also with a clutch through which the drum may be driven from the engine. With at least one of the engines of steam shovels it is desirable to set the clutch with each operation of the engine.

The present invention has for its object to simplify the engine and the clutch whereby a single control may be utilized for operating both, thus relieving the operator of the necessity for a separate operation.

The invention is illustrated in the accompanying drawings wherein it is exemplified as applied to a steam shovel as follows:—

Figure 1 shows a plan view of the shovel. Figs. 2, 3, 4 and 5 show sections of parts of the controlling chest and valve on the lines 2—2 in Fig. 1, the valve in the different sections being in different positions. Fig. 6 shows a side elevation of the engine. Fig. 7 a section on the line 7—7 in Fig. 6.

1 marks the shovel frame, 2 one of the axles, 3 the wheels, 5 the rotating table, 6 the boom, 7 the gear actuating the dipper stick (not shown), 8 a pinion driving the gear 7, 9 the crowding engine, $9^a$ the steam chest of the crowding engine, $9^b$ the pipe leading to the crowding engine, 10 a shaft for rotating the table, 11 a beveled gear on the shaft, 12 a pinion rotating the gear, 13 a swinging engine for rotating the table, $13^a$ a chest for the engine rotating the table, $13^b$ a steam pipe leading to said chest, 14 a drum for operating the dipper stick (cable and stick not shown), 15 a shaft on which the drum is mounted, 16 the hoisting engine frame, 17 a bearing for the drum shaft, 18 a gear on the drum shaft for driving the drum, 19 a pinion driven by the hoisting engine for actuating the gear 18, 20 the crank shaft of the hoisting engine, 21 the crank, 22 the connecting rod, 23 the cross head, 24 the cylinder, 25 the controlling valve chest, 26 a plate having steam passages leading from the controlling valve to the steam chests of the hoisting engine. The parts so far as mentioned except the controlling valve chest may be of any desired construction and operate in the well known manner.

The hoisting engine of the steam shovel is commonly used for driving the shovel from one location to another. In the present engine, this is accomplished through a gear $15^a$ on the drum shaft, the gear being adapted to be locked with the drum shaft by a clutch $15^b$. The gear $15^a$ drives a gear $15^c$ on the shaft $15^d$. A pinion $15^e$ is also fixed on the shaft $15^d$ and drives a beveled gear $15^f$ on a shaft $15^g$, the shaft $15^g$ being in the center of the turn table and being connected by mechanism not shown with the wheels of the shovel so as to afford means of locomotion. For this purpose the hoisting engine is commonly provided with a reversing mechanism.

The controlling valve chest has the ports $27^a$ and $28^a$ leading to the passages 27 and 28. The passages 27 and 28 lead to the engine steam chests and as the steam is reversed in these passages so the engine is reversed, one passage acting as the steam inlet and the other as the exhaust passage and these may be reversed to reverse the engine. This is a common method of handling engines of this type. The passage 29 leads from the controlling valve chest and is designed to deliver steam to the steam chest to hold the valve of the engine (not shown) in place. This also is a common 'expedient. The exhaust port 30 leads from the valve chest to an exhaust passage 31. This exhaust port is between the ports $27^a$ and $28^a$ and may be put into connection with either of them by the valve 32. The valve 32 has a valve port 33 of a size capable of coupling, as before stated, the exhaust port 30 with either of the ports $27^a$ or $28^a$ depending on the direction it is desired to drive the engine. Steam is admitted to the valve chest through the steam passage 34.

The controlling valve is operated through the following mechanism:—The valve stem 35 has the forked end 36. A link 37 connects the forked end 36 with a rock lever 38. The rock lever 38 is fixed on a shaft 39. A rock lever 39ª extends from the shaft 39 and the link 40 connects the rock lever 39ª with a bell crank lever 41, the bell crank lever 41 being mounted on the pin 42 extending from the engine frame. A link 43 connects the bell crank lever 41 with the lever 44. The lever 44 is carried by a pin 45, the pin being carried by any convenient support. It will be readily observed that as the lever 44 is moved, the valve 32 is also moved so that it may be thrown into position to couple either of the ports 27ª or 28ª with the exhaust port and thus reverse the engine, or it may be thrown to neutral and cut off both engines. In the position shown in Fig. 3 the valve is in position to drive the engine in the direction ordinarily termed forward. In the position shown in Fig. 4 both engines are shut off. In the position shown in Fig. 5 the steam is reversed so as to drive the engine backward, steam being delivered to the port 28ª.

The drum 14 is provided with a friction wheel 46 forming the driven member of the clutch. The friction band 47 is arranged to operate on the friction wheel 46. One end of the band is anchored by a bolt 48 which extends through the pin 49. The opposite end of the band is secured to a pin 50 eccentrically mounted on the shaft 51. The shaft 51 is mounted in the bearing 52 in the gear wheel 18. A rock lever 53 is mounted on the shaft 51. The piston 54 is connected by means of the extension 55 with the lever 53, the connection being formed through the pin 56. The piston 54 is mounted in the steam cylinder 57. The cylinder 57 is pivotally mounted on the gear by means of the pin 58 which extends through the ear 59 at the rear end of the cylinder. The cylinder is connected by means of a pipe 60 with a bore in the center of the shaft 15 (see dotted lines Fig. 6) and this opening in the shaft 15 is connected with a pipe 61. The pipe 61 leads to a chamber 62 in the controlling valve chest. A spring 63 is connected with the lever 53 by means of a pin 64. A bolt 65 is secured to the opposite end of the spring and extends through a lug 66 on the gear, the spring being adjusted by a nut 67 on the bolt 65.

The operation of this friction clutch is as follows: When steam is turned in back of the piston 54, the piston is actuated swinging the rock lever 53 and rocking the pin 50 so as to tighten the friction band 47. When the steam is released from the cylinder 57, the spring 63 returns the piston and swings the pin 50 so as to release the friction band and thus release the clutch.

The chamber 62 is connected with the valve face of the controlling valve chest by a port 68. This has a small port and a notch 69 in the lip of the valve registers with the port 68 so that the port may be placed closer to the port 27ª and not be prematurely closed by the overlap of the valve 32. The valve has a valve port 70 adapted to couple the clutch port 68 with the port 27ª so that the clutch port 68 may be exhausted through the port 27ª.

The operation of the valve in relation to the several ports and the clutch is as follows: Starting with the valve in the position shown in Fig. 2, the clutch port is in connection with the port 27ª and the port 27ª is coupled with the exhaust port 30 and steam is cut off from the port 28ª. With the valve in the position shown in Fig. 2 the clutch is released and the engine is shut down. With the valve moved to the position shown in Fig. 3, the engine is running forward, steam being delivered to the steam passage 27 and exhausted by way of the passage 28 and exhaust port 30. Steam has also been delivered to the clutch port 68 so that the clutch is set. It will be understood that when the shovel alone is being operated, the engine runs only in one direction to return the shovel. Where this is done, the passage 27 operates as the inlet continuously and the passage 28 as the exhaust. It is only when the engine is used for the purpose of locomotion that the reversing feature is used. Following the movement of the valve from the position shown in Fig. 2 to the position shown in Fig. 3 it will be noted that the clutch will be set prior to the starting of the engine.

In steam shovel work it is desirable to utilize the engine as a brake on the drum. Under these conditions it is desirable to wire-draw the exhaust and at the same time retain the clutch in its set position. The valve in the position shown in Fig. 4 accomplishes this result, steam being on through the port 68 and at the same time the engine is exhausting through a reduced or restricted exhaust passage or port. With the valve in the position shown in Fig. 5 the engine is reversed. Under these conditions the clutch is released. Where the engine is used for locomotion, this being the only condition on which the valve is in the position shown in Fig. 5, the valve 71 in the pipe 61 will be closed so as to cut out the clutch operating on the drum regardless of which direction the engine is driven.

It will be observed from the foregoing description the operator operates both the clutch and the engine from a single controlling lever and by positioning the controlling lever can control the sequence of events.

What I claim as new is:—

1. In an engine and friction clutch control, the combination of an engine; a fluid actuated clutch comprising a driving member driven by the engine and a driven member; a controlling valve chest having a steam and exhaust port leading to the engine and a port connected with the fluid actuated clutch; and a controlling valve operating in said chest and over said ports and adapted to control the flow of steam to the engine and to the fluid actuated clutch and to exhaust the steam from the clutch by way of the exhaust port.

2. In an engine and friction clutch control, the combination of an engine; a fluid actuated clutch comprising a driving member driven by the engine and a driven member; a controlling valve chest having reversing ports leading therefrom to the engine and a port leading to the clutch; and a reversing controlling valve operating on said ports and adapted to reverse the engine by reversing the steam through said ports, said controlling valve also controlling the port leading to the clutch.

3. In an engine and friction clutch control, the combination of an engine; a fluid actuated clutch comprising a driving member driven by the engine and a driven member; a controlling valve chest having two steam ports for the engine; an exhaust port and a port connected with the clutch; and a valve operating from said ports and adapted to couple the steam passages alternately with the exhaust passage and to control the clutch port.

4. In an engine and friction clutch control, the combination of an engine; a fluid actuated clutch comprising a driving member driven by the engine and a driven member; a controlling valve chest having two steam ports for the engine; an exhaust port and a port connected with the clutch; and a valve operating over said ports and adapted to couple the steam passages alternately with the exhaust passage and to control the clutch port, and having a sequence of closing permitting the closing of the ports of the engine prior to the closing of the clutch port.

5. In an engine and friction clutch control, the combination of an engine; a clutch comprising a driving member driven by the engine and a driven member; a controlling device for the engine adapted to stop and reverse the engine; and a single controlling means controlling the clutch and the controlling device.

6. In an engine and friction clutch control, the combination of an engine; a fluid actuated clutch comprising a driving member driven by the engine and a driven member; a reversing valve for controlling and reversing the engine; devices controlling the flow of fluid to the clutch; and a single controlling means controlling the reversing valve and said devices.

In testimony whereof I have hereunto set my hand in the presence of two subscribing witnesses.

CLARENCE B. WESTON.

Witnesses:
B. M. HARTMAN,
V. C. HESS.